US012525710B2

(12) United States Patent
Cho

(10) Patent No.: US 12,525,710 B2
(45) Date of Patent: Jan. 13, 2026

(54) ELECTRONIC DEVICE

(71) Applicant: Advanced Semiconductor Engineering, Inc., Kaohsiung (TW)

(72) Inventor: Wei-Chih Cho, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 267 days.

(21) Appl. No.: 18/108,495

(22) Filed: Feb. 10, 2023

(65) Prior Publication Data

US 2024/0275038 A1 Aug. 15, 2024

(51) Int. Cl.
*H01Q 1/22* (2006.01)
*H01Q 1/46* (2006.01)

(52) U.S. Cl.
CPC ............. *H01Q 1/46* (2013.01); *H01Q 1/2283* (2013.01)

(58) Field of Classification Search
CPC ...... H01Q 1/46; H01Q 1/2283; H01Q 21/065; H01Q 1/36; H01Q 1/48
See application file for complete search history.

(56) References Cited

U.S. PATENT DOCUMENTS 10,971,798 B2 4/2021 Liao et al.
2013/0189935 A1* 7/2013 Nair ......................... H01Q 1/38 343/700 MS
2018/0331050 A1* 11/2018 Chung .................. H01L 21/568
2019/0334228 A1* 10/2019 Haridas .............. H01Q 21/0025
2022/0320020 A1* 10/2022 Hsu ..................... H01L 23/5384

FOREIGN PATENT DOCUMENTS

TW M566921 U 9/2018

* cited by examiner

*Primary Examiner* — David E Lotter
(74) *Attorney, Agent, or Firm* — FOLEY & LARDNER LLP

(57) ABSTRACT

The present disclosure provides an electronic device. The electronic device includes a carrier and an interconnection structure disposed over the carrier and having a plurality of conductive pads. One of the plurality of conductive pads is adjustable to function as a functional pad or a non-functional pad for an antenna unit.

16 Claims, 18 Drawing Sheets

ELECTRONIC DEVICE

BACKGROUND

1. Technical Field

The present disclosure relates to an electronic device.

2. Description of the Related Art

Antenna package(s) (such as Antenna in Package (AiP) and antenna in module (AiM)) may include an antenna layer and a radio frequency (RF) routing layer electrically coupled thereto. Conventionally, a molding compound may be used to encapsulate the antenna layer and the RF routing layer. The molding compound may cover the antenna layer and may inadvertently affect the antenna performance.

In addition, to support higher data rates, increased functionality, and more users, it is preferable that different antenna units (such as antenna units having different numbers of antennas, different sizes, different frequency bands, etc.) can be electrically coupled to the same RF routing layer and can be changed as needed.

SUMMARY

In some arrangements, an electronic device includes a carrier and an interconnection structure disposed over the carrier and having a plurality of conductive pads. One of the plurality of conductive pads is adjustable to function as a functional pad or a non-functional pad for an antenna unit.

In some arrangements, an electronic device includes a carrier and an interconnection structure disposed over the carrier and configured to electrically couple an antenna unit to the carrier. The interconnection structure includes a main portion over which the antenna unit is disposed and a plurality of extending portions extending from the main portion and downward to carrier for supporting the main portion over the carrier.

In some arrangements, an electronic device includes an interconnection structure having a plurality of conductive pads. The plurality of conductive pads are configured to allow antenna units of different terminals to be attachable.

BRIEF DESCRIPTION OF THE DRAWINGS

Aspects of some arrangements of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
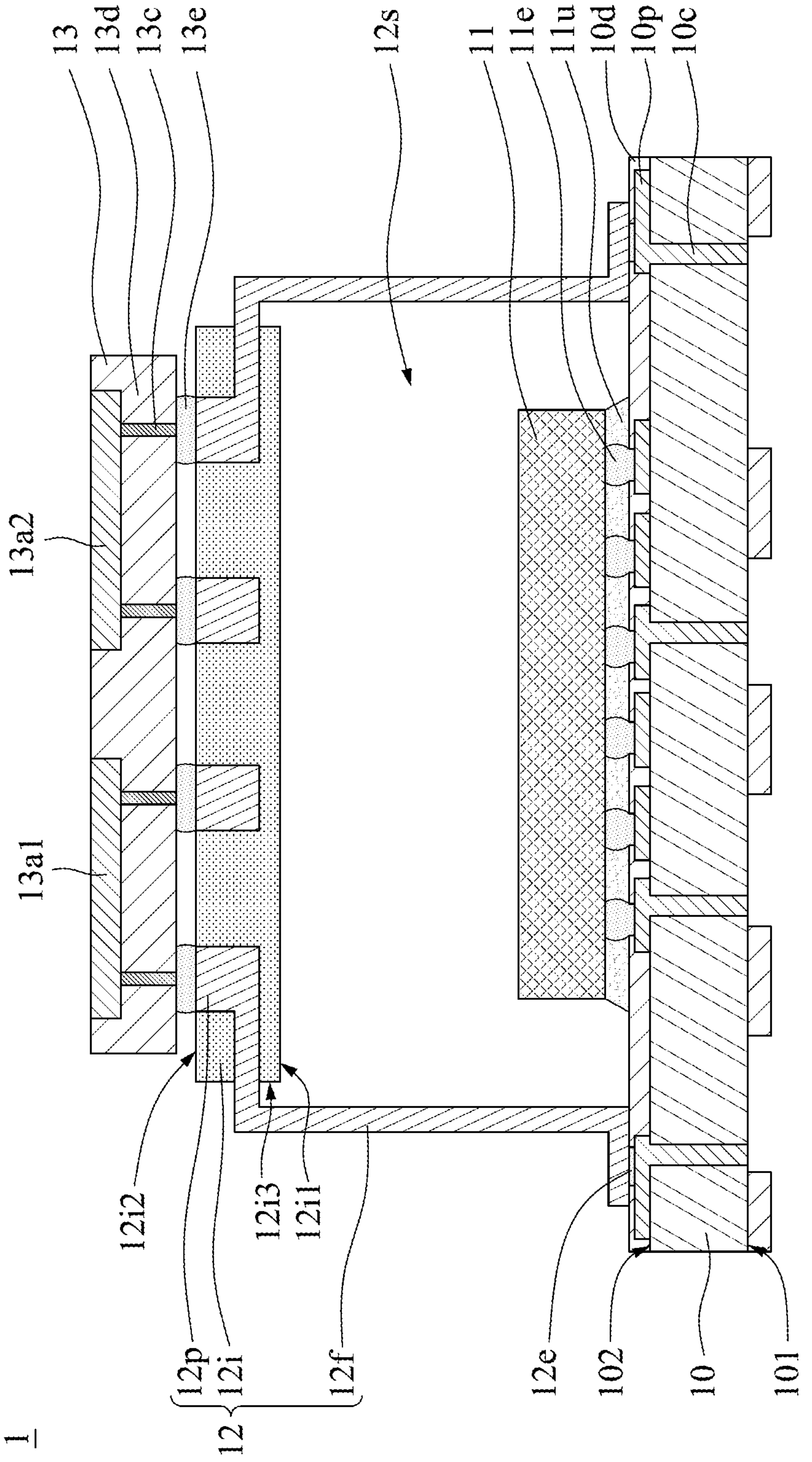
FIG. 1A illustrates a cross-sectional view of an electronic device in accordance with some arrangements of the present disclosure.

The following disclosure provides many different arrangements, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include arrangements in which the first and second features are formed or disposed in direct contact, and may also include arrangements in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of arrangements of this disclosure are not deviated from by such arrangement.

FIG. 1A illustrates a cross-sectional view of an electronic device 1 in accordance with some arrangements of the present disclosure. In some arrangements, the electronic device 1 may be or include, for example, an antenna device or an antenna package. In some arrangements, the electronic device 1 may be or include, for example, a wireless device, such as user equipment (UE), a mobile station, a mobile device, an apparatus communicating with the Internet of Things (IoT), and others. In some arrangements, the electronic device 1 may include a carrier 10, an electronic component 11, an interconnection structure 12, and an antenna unit 13.

The carrier 10 may include a substrate. For example, the carrier 10 may include a printed circuit board (PCB), such as a paper-based copper foil laminate, a composite copper foil laminate, or a polymer-impregnated glass-fiber-based copper foil laminate. In some arrangements, the carrier 10 may include or may be a circuit layer or a routing layer, such as a radio frequency (RF) routing layer. The carrier 10 may have a surface 101 and a surface 102 opposite to the surface 101.

In some arrangements, the carrier 10 may include conductive layer(s), pad(s), trace(s), via(s), or other conductive element(s). For example, the carrier 10 may include one or more conductive pads 10*p* in proximity to, adjacent to, or embedded in and exposed by the surface 101 and/or the surface 102 of the carrier 10. The carrier 10 may include a dielectric layer (such as a solder resist) 10*d* on the surface 101 and/or the surface 102 to fully or partially expose at least a portion of the conductive pads 10*p* for electrical connections of the electronic component 11 and the interconnection structure 12.

For example, the carrier 10 may include one or more conductive elements 10*c*. In some arrangements, the conductive element 10*c* may include a conductive via. In some arrangements, the conductive element 10*c* may extend through a part of the carrier 10 (such as a dielectric layer thereof) and electrically connect with the conductive pad 10*p*.

In some arrangements, the conductive element 10*c* may include or function as a transmission line (e.g., a coaxial cable, a bifilar line, a waveguide, etc.). For example, the conductive element 10*c* of the carrier 10 may be electrically coupled to the antenna unit 13 through the interconnection structure 12. The conductive element 10*c* of the carrier 10 and the interconnection structure 12 may be configured to feed RF signals into one or more antennas of the antenna unit 13. In some arrangements, the RF signals may be generated from the electronic component 11 and/or a feed network (not shown in the figures).

In some arrangements, the carrier 10 may include a grounding element (not shown in the figures), such as a reference layer, a ground layer or a ground plane. The grounding element may be disposed adjacent to the surface 101 and/or the surface 102 of the carrier 10. In some arrangements, the grounding element of the carrier 10 may be electrically coupled to the antenna unit 13 through the interconnection structure 12. In some arrangements, the grounding element and the interconnection structure 12 may be configured to ground one or more antennas of the antenna unit 13.

The electronic component 11 may be disposed over or on the surface 102 of the carrier 10. The electronic device 11 may be electrically coupled to the carrier 10 through solder bonding, Cu-to-Cu bonding, wire bonding, or hybrid bonding. For example, the electronic device 11 may be electrically coupled to the carrier 10 through an electrical contact 11*e*. In some arrangements, the electrical contacts 11*e* may include solder balls or solder bumps, such as a controlled collapse chip connection (C4) bump, a ball grid array (BGA) or a land grid array (LGA). In some arrangements, the electrical contacts 11*e* may be covered by an underfill 11*u*.

The electronic component 11 may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some arrangements, the electronic component 11 may include a transmitter, a receiver, or a transceiver. In some arrangements, the electronic component 11 may include a processing unit and/or a controller. In some arrangements, the electronic component 11 may include a radio frequency IC (RFIC), an analog-to-digital (A/D) converter, a digital-to-analog (D/A) converter, a filter, a low noise amplifier (LNA), a power amplifier, a multiplexer, a demultiplexer, a modulator, and/or a demodulator, etc. In some arrangements, there may be any number of electronic components depending on design requirements.

The electronic component 11 may be electrically coupled to the antenna unit 13. The electronic device 11 may be electrically coupled to the antenna unit 13 through the carrier 10 and the interconnection structure 12. In some arrangements, the electronic component 11 may be configured to generate RF signals for transmission via the antenna unit 13 and/or to process received RF signals from the antenna unit 13. In some arrangements, the signal transmission path may be attained by the carrier 10 and the interconnection structure 12.

In some arrangements, the electronic component 11 may be configured to control the antenna unit 13. For example, the electronic component 11 may be configured to control the feeding start and end time, the feeding duration, the number of the feed pad, the location of the feed pad, the RF impedance matching, the transmitting start and end time, the receiving start and end time, the grounding start and end time, the grounding duration, the number of the ground pad, the location of the ground pad, the frequencies (or operating frequencies), the bandwidths (or operating bandwidths), the wavelengths of the electromagnetic (EM) waves, etc.

The interconnection structure 12 may be disposed over or on the surface 102 of the carrier 10. The interconnection structure 12 may be electrically coupled to the carrier 10 through solder bonding, Cu-to-Cu bonding, wire bonding, or hybrid bonding. For example, the interconnection structure 12 may be electrically coupled to the carrier 10 through an electrical contact 12*e*. The interconnection structure 12 may include an interposer or a connector configured to electrically couple the antenna unit 13 with the carrier 10.

In some arrangements, the carrier 10 may have a mechanical or magnetic means to resist or arrest the movement of the interconnection structure 12. The mechanical or magnetic means may prevent unintended separation of the interconnection structure 12 and the carrier 10. The mechanical or magnetic means may include locking elements, fastening elements, retaining elements, etc. More specifically, the mechanical or magnetic means may include a pin, a post, a spring, a plugger, a buffer, a snap, a clip, a contour, etc. The interconnection structure 12 may be detachable from the carrier 10. The interconnection structure 12 may be attached, removed, and reattached with respect to the carrier 10. In some arrangements, the carrier 10 may include a fastening hole and an end of the interconnection structure 12 may be fixed in the fastening hole to connect to a conductive pad in the fastening hole. In some arrangements, the end of the interconnection structure 12 may be fixed in the fastening hole through a soldering material.

In some arrangements, the interconnection structure 12 may include a main portion over which the antenna unit 13 is disposed and a plurality of extending portions extending from the main portion and downward to carrier 10 for supporting the main portion over the carrier 10. In some arrangements, the interconnection structure 12 may be a lead frame or a part thereof. In some arrangements, the interconnection structure 12 may include conductive elements, such as frames (or leads, stands, legs, anchors, clamping supports, etc.) 12*f* and an insulating layer 12*i*. In some arrangements, the insulating layer 12*i* may be the main portion over which the antenna unit 13 is disposed and the frames 12*f* may be the plurality of extending portions extending from the main portion and downward to carrier 10 for supporting the main portion over the carrier 10.

In some arrangements, the frames 12*f* may each include a conductive material such as metal or metal alloy. Examples of the conductive material include gold (Au), silver (Ag), aluminum (Al), copper (Cu), platinum (Pt), Palladium (Pd), other metal(s) or alloy(s), or a combination of two or more thereof. In some arrangements, the frames 12*f* may each be bendable, flexible, and/or twistable. In some arrangements, the insulating layer 12*i* may include an epoxy resin having fillers, a molding compound (e.g., an epoxy molding compound or another molding compound), a polyimide, a phenolic compound or material, a material with a silicone dispersed therein, or a combination thereof.

The insulating layer 12*i* may include a plate or a board shape. The insulating layer 12*i* may include a rectangular shape from a top view in FIG. 1B. However, the insulating layer 12*i* may include other shapes, such as a circle, an oval, a triangle, a quadrangle, a polygon, etc. The insulating layer 12*i* may include a surface 12*i*1 facing the carrier 10, a surface 12*i*2 opposite to the surface 12*i*1, and a surface (or a lateral surface) 12*i*3 extending between the surface 12*i*1 and the surface 12*i*2.

The frames 12*f* may be spaced from (or separated from) one another. The frames 12*f* may be disposed on at least two sides (or two surface 12*i*3) of the insulating layer 12*i*. The frames 12*f* may each be partially covered by the insulating layer 12*i*. The frames 12*f* may each extend through the surface 12*i*3 of the insulating layer 12*i*. For example, the frames 12*f* may each have a portion extending in the surface 12*i*3 of insulating layer 12*i* in a direction substantially parallel to the surface 102 of the carrier 10. However, in some arrangements, one or more of the frames 12*f* may extend through the surface 12*i*1 of the insulating layer 12*i*.

The frames 12*f* may each extend from the surface 12*i*3 of the insulating layer 12*i* to the surface 102 of the carrier 10 to contact the electrical contact 12*e*. In some arrangements, one or more of the frames 12*f* may be fixed on the carrier 10 through a mechanical or magnetic mean. In some arrangements, the frames 12*f* may each have a bending portion disposed over or on the surface 102 of the carrier 10.

In some arrangements, the frames 12*f* may each be at least partially exposed from the surface 12*i*2 of insulating layer 12*i*. An exposed portion of the frame 12*f* may include or function as a conductive pad 12*p*.

Figure 1B:
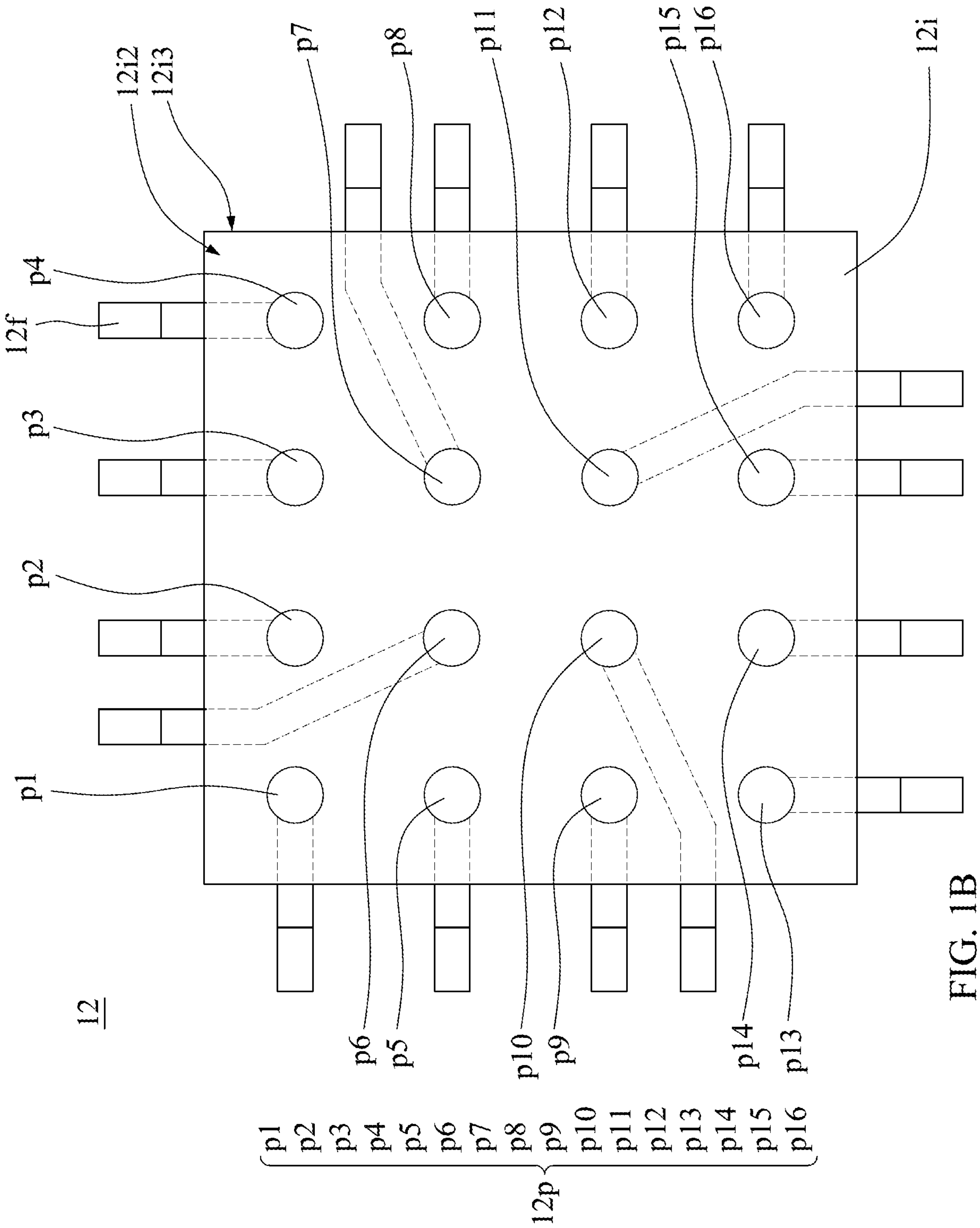
FIG. 1B illustrates a top view of a part of an electronic device in accordance with some arrangements of the present disclosure.

Referring to FIG. 1B, it illustrates a top view of the interconnection structure 12 in accordance with some arrangements of the present disclosure. The conductive pads 12*p* may be arranged in rows or an array, such as a 2×2 array, a 4×4 array, an 8×8 array, a 16×16 array, etc. For example, the conductive pads 12*p* may include conductive pads p1, p2, p3, p4, p5, p6, p7, p8, p9, p10, p11, p12, p13, p14, p15, and p16 arranged in a 4×4 array. The shape, location, and number of the conductive pads in FIG. 1B are for illustrative purposes only, and not intended to limit the present disclosure. The conductive pads 12*p* may include one or more functional pads and/or one or more non-functional pads. The functional pads may act or function to complete an instruction from the electronic component 11. The functional pads may transmit a signal from the electronic component 11. The functional pads may include signal pads (such as feed pads for feeding RF signals) and ground pads. The non-functional pads may be electrically disconnected from the antenna unit 13 and/or the electronic component 11. The non-functional pads may include dummy pads.

In some arrangements, one or more of the conductive pads 12*p* may be configured to be electrically coupled to the antenna unit 13. For example, the conductive pads p6, p7, p10, and p11 may be configured to function as feed pads. For example, the feed pads may be configured to feed RF signals into one or more antennas of the antenna unit 13.

For example, the conductive pads p2, p3, p5, p8, p9, p12, p14, and p15 may be configured to function as ground pads. For example, the ground pads may be configured to ground one or more antennas of the antenna unit 13. In some arrangements, the ground pads may be configured to provide a return path for the RF signals and reduce signal noise. In some arrangements, the ground pads may be disposed around the feed pads. For example, the ground pads may form an imaginary boundary surrounding the feed pads from a top view. For example, the feed pads may be disposed inside of the ground pads from a top view. For example, the ground pads may be closer to the surface (or a lateral surface) 12*i*3 of the insulating layer 12*i* than the feed pads from a top view. In some arrangements, the ground pads may be configured to provide an electromagnetic interference (EMI) shielding protection for the antenna unit 13. For example, the ground pads may be configured to provide an EMI shielding around the feed pads to prevent the antenna unit 13 from being interfered with by other electronic components, and vice versa.

In some arrangements, one or more of the conductive pads 12*p* may be electrically disconnected from the antenna unit 13. For example, the conductive pads p1, p4, p13, and p16 may be electrically disconnected from the antenna unit 13. In some arrangements, the conductive pads p1, p4, p13, and p16 may be dummy pads disconnected from the antenna unit 13. In some arrangements, the dummy pads may be configured to enhance structural strength and stability for the interconnection structure 12. For example, the dummy pads may be configured to structurally support the antenna unit 13.

In some arrangements, the electronic component 11 may be configured to control the electrical connections and the functions of the conductive pads 12*p*. For example, as stated, the electronic component 11 may be configured to control the number and location of the feed pads and the location of the ground pads. For example, the conductive pads 12*p* may be controlled by the electronic component 11 such that the conductive pads 12*p* may be adjustable to function as a functional pad, or a non-functional pad. For example, the conductive pads 12*p* may be controlled by the electronic component 11 such that the conductive pads 12*p* may be adjustable to function as a feed pad, a ground pad, or a dummy pad. The location and number of the feed pads and ground pads described above are for illustrative purposes only, and not intended to limit the present disclosure.

Referring back to FIG. 1A, the interconnection structure 12 and the carrier 10 may define a space 12*s*. The space 12*s* may be an empty space or an air cavity. The electronic component 11 may be accommodated in the space 12*s*. For example, the electronic component 11 may be surrounded by the frames 12*f* of the interconnection structure 12. For example, the electronic component 11 may be disposed between the insulating layer 12*i* of the interconnection structure 12 and the carrier 10. For example, the electronic component 11, the insulating layer 12*i* of the interconnection structure 12, and the carrier 10 may be vertically overlapped (such as along a direction substantially perpendicular to the surface 102 and/or the surface 101 of the carrier 10).

In some arrangements, the space 12*s* may expose a part of the surface 102 of the carrier 10. For example, a part of the surface 102 of the carrier 10 may be uncovered. In some arrangements, the space 12*s* may expose a part of the surface 12*i*1 of the insulating layer 12*i* of the interconnection structure 12. For example, a part of the surface 12*i*1 of the insulating layer 12*i* of the interconnection structure 12 may be uncovered. In some arrangements, the insulating layer 12*i* of the interconnection structure 12 may be physically separated from the carrier 10 by the space 12*s*.

In some arrangements, the space 12*s* may serve as a resonant cavity. For example, the space 12*s* may function as a resonant cavity. For example, the EM waves radiated or transmitted by the antennas of the antenna unit 13 may resonate in the space 12*s*. The space 12*s* may be located below the antenna unit 13. The antenna unit 13 may be spaced apart from the carrier 10 through the space 12*s*. In some arrangements, a thickness of the space 12*s* (such as a distance between the surface 12*i*1 of the insulating layer 12*i* of the interconnection structure 12 and the surface 102 of the carrier 10) may be equal to or greater than about 2.3 mm.

The antenna unit 13 may be disposed over or on the surface 12*i*1 of the insulating layer 12*i* of the interconnection structure 12. The antenna unit 13 may be electrically coupled to the interconnection structure 12 through an electrical contact 13*e*.

The antenna unit 13 may include a plurality of antennas (such as the antennas 13*a*1 and 13*a*2) and a dielectric layer 13*d* for supporting the antennas. The antennas may be disposed adjacent to a surface of the dielectric layer 13*d* facing away from the carrier 10. The antennas may be substantially coplanar with a surface of the dielectric layer 13*d* facing away from the carrier 10. In some arrangements, the antennas may protrude from a surface of the dielectric layer 13*d* facing away from the carrier 10.

In some arrangements, the antennas may each include a patch antenna, such as a planar inverted-F antenna (PIFA) or another feasible type. In some arrangements, the antennas may each include a conductive material such as metal or a metal alloy. Examples of the conductive material include gold (Au), silver (Ag), aluminum (Al), copper (Cu), platinum (Pt), Palladium (Pd), other metal(s) or alloy(s), or a combination of two or more thereof. In some arrangements, the dielectric layer 13*d* of the antenna unit 13 supporting the antennas may include pre-impregnated composite fibers (e.g., pre-preg), Borophosphosilicate Glass (BPSG), silicon oxide, silicon nitride, silicon oxynitride, Undoped Silicate Glass (USG), any combination of two or more thereof, or the like.

The antenna unit 13 may be configured to radiate EM waves at about 2.4 GHz, 28 GHz, 39 GHz, etc. In some arrangements, the antenna unit 13 may have different frequencies (or operating frequencies) or bandwidths (or operating bandwidths). For example, the antenna unit 13 may be configured to radiate EM waves of different frequencies or different bandwidths. For example, the antenna 13*a*1 may have an operating frequency higher than an operating frequency of the antenna 13*a*2, or vice versa. For example, the antenna 13*a*1 may be operated at a frequency of about 39 GHz and the antenna 13*a*2 may be operated at a frequency of about 28 GHz, or vice versa.

In some arrangements, one or more conductive elements 13*c* may extend within the dielectric layer 13*d* and electrically connect the transmission lines (such as the conductive elements 10*c* in the carrier 10) and the feed pads (such as one or more of the conductive pads 12*p* of the interconnection structure 12) to one of the antennas of the antenna unit 13. In some arrangements, one or more conductive elements 13*c* may function as a feed point. In some arrangements, at least two of the conductive pads 12*p* may be adjustable to serve as feed pads connected to the feed points.

In some arrangements, one or more conductive elements 13*c* may electrically connect the grounding elements in the carrier 10 and the ground pads (such as one or more of the conductive pads 12*p* of the interconnection structure 12) to one of the antennas of the antenna unit 13. In some arrangements, one or more conductive elements 13*c* may function as a ground point.

In some embodiments, the conductive elements 13*c* may include, but are not limited to, a conductive pillar, a bonding wire, a conductive via, stacked vias, etc.

Figure 1C:
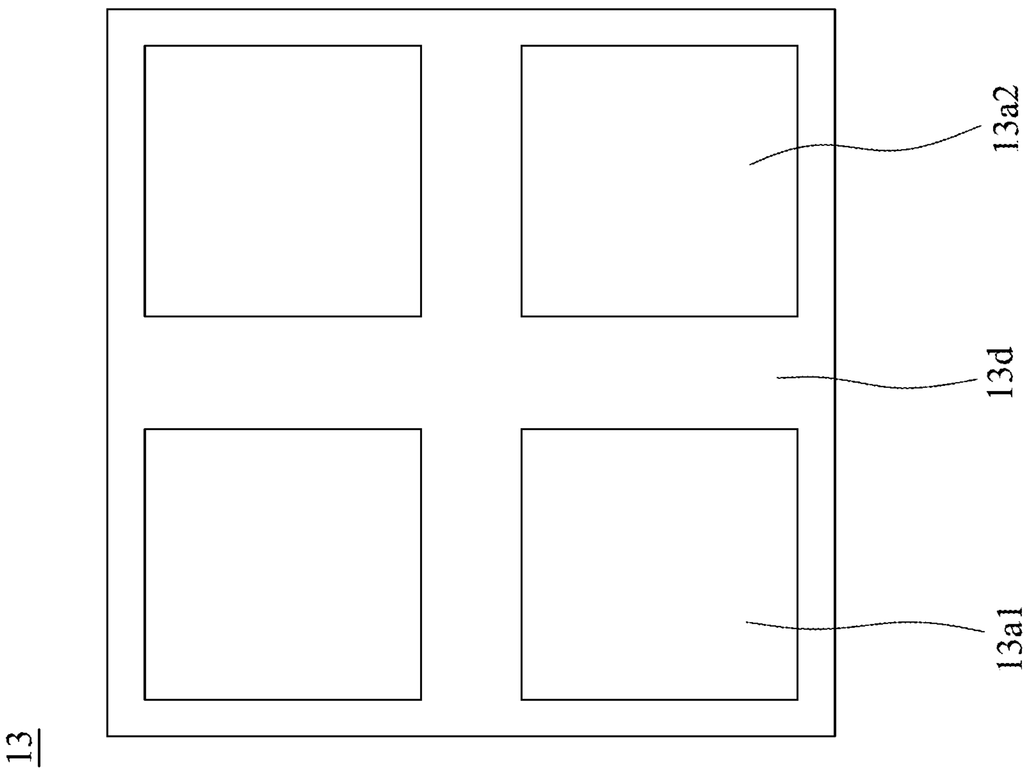
FIG. 1C illustrates a top view of a part of an electronic device in accordance with some arrangements of the present disclosure.
Figure 1D:
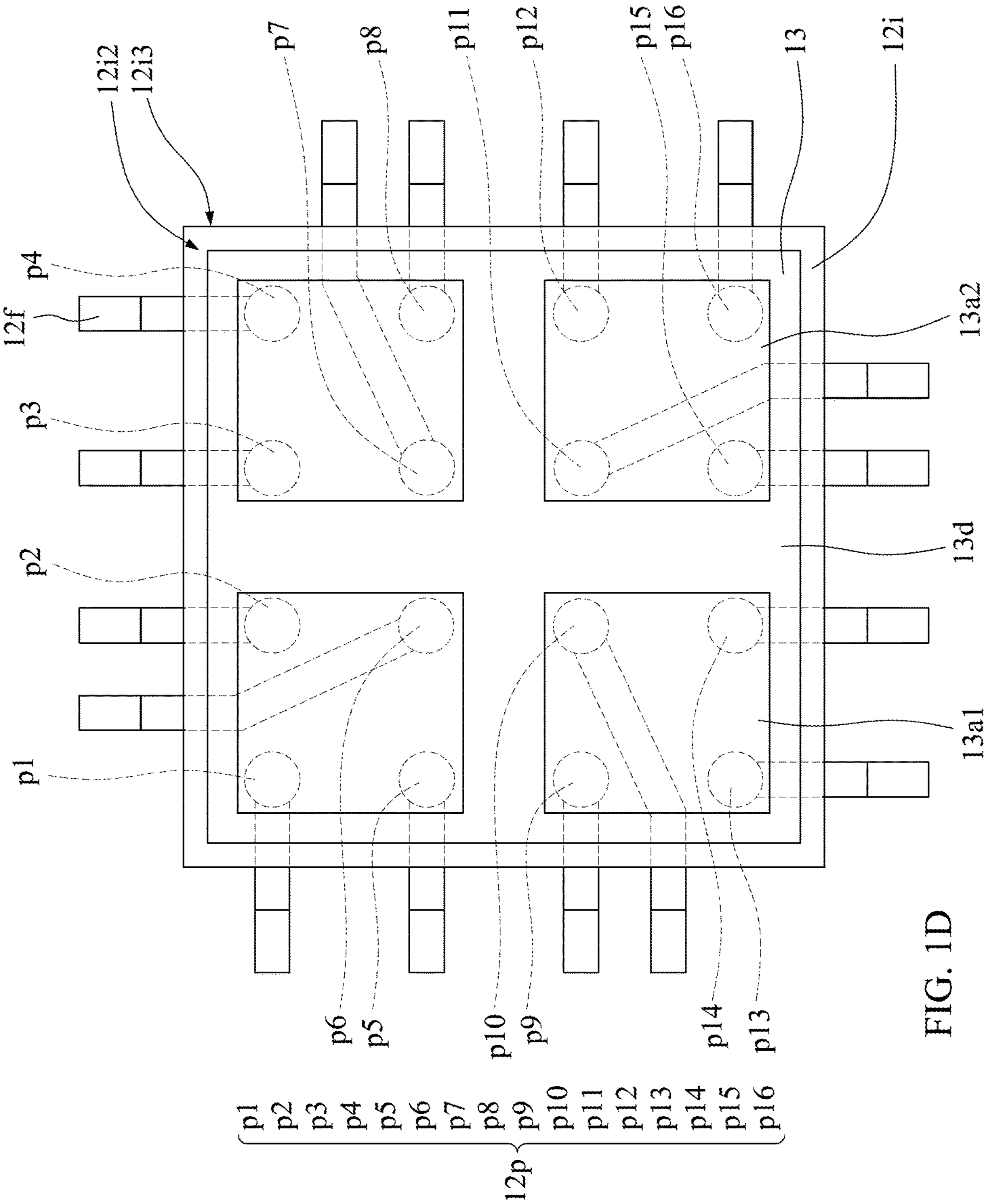
FIG. 1D illustrates a top view of a part of an electronic device in accordance with some arrangements of the present disclosure.

Referring to FIG. 1C, it illustrates a top view of the antenna unit 13 in accordance with some arrangements of the present disclosure. In some arrangements, the antennas (such as the antennas 13*a*1 and 13*a*2) may define or include an antenna pattern. For example, the antennas may be arranged in rows or an array, such as a 2×2 array, a 4×4 array, an 8×8 array, a 16×16 array, etc. The shape, location, and number of the antennas in FIG. 1C are for illustrative purposes only, and not intended to limit the present disclosure.

Referring to FIG. 1C, it illustrates a top view of the antenna unit 13 disposed over the interconnection structure 12 in accordance with some arrangements of the present disclosure. In some arrangements, a cross-sectional view of FIG. 1C through line AA' may be similar to FIG. 1A.

The antennas of the antenna unit 13 may each cover one or more of the conductive pads 12*p*. For example, for a 2×2 array antenna like FIG. 1C, the antennas of the antenna unit 13 may each cover four conductive pads 12*p*. The electronic component 11 in FIG. 1A may control the feed pads (such as the conductive pads p6, p7, p10, and p11) to feed RF signals into the corresponding antennas of the antenna unit 13 to activate the antennas and to radiate the EM waves.

Figure 2A:
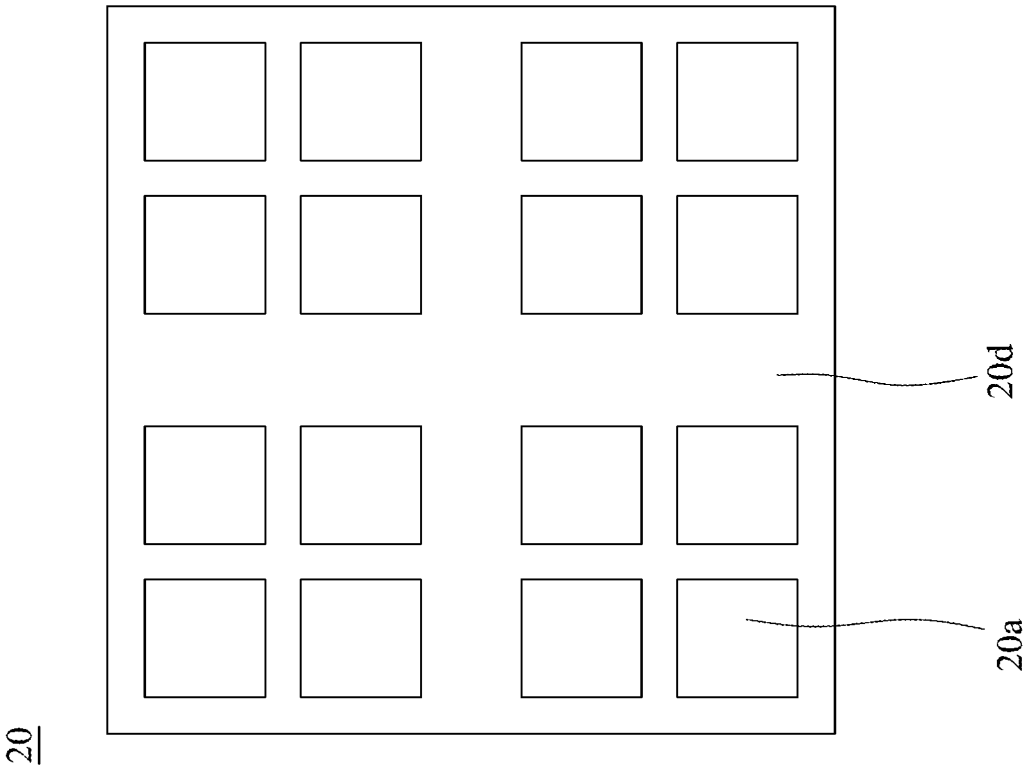
FIG. 2A illustrates a top view of a part of an electronic device in accordance with some arrangements of the present disclosure.
Figure 2B:
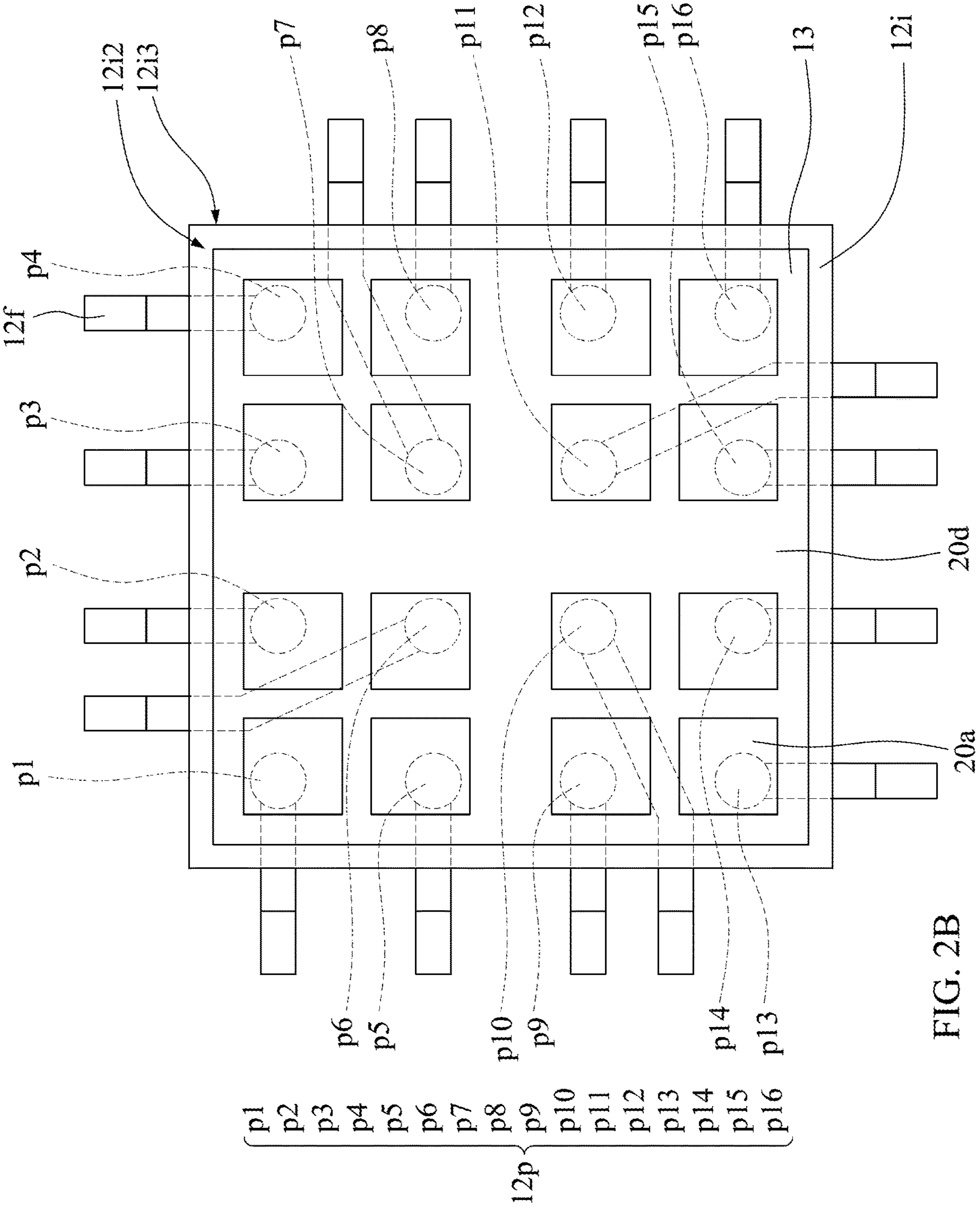
FIG. 2B illustrates a top view of a part of an electronic device in accordance with some arrangements of the present disclosure.

Referring to FIG. 2A and FIG. 2B, FIG. 2A illustrates a top view of an antenna unit 20 and FIG. 2B illustrates a top view of the antenna unit 20 disposed over the interconnection structure 12. The antenna unit 20 may include a plurality of antennas 20*a* and a dielectric layer 20*d* for supporting the antennas. The antenna unit 20 is similar to the antenna unit 13 except that the antennas 20*a* are arranged in a 4×4 array. The antennas 20*a* of the antenna unit 20 may each cover one of the conductive pads 12*p*. The electronic component 11 in FIG. 1A may control the feed pads (such as the conductive pads p1 thru p16) to feed RF signals into the corresponding antennas 20*a* of the antenna unit 20 to activate the antennas and to radiate the EM waves.

Referring back to FIG. 1A, in some arrangements, the number of the conductive elements 13*c* of the antenna unit 13 and the number of the conductive pads 12*p* of the interconnection structure 12 may be different. For example, at least one of the conductive elements 13*c* of the antenna unit 13 may not be aligned with the conductive pads 12*p* of the interconnection structure 12. For example, at least one of the conductive elements 13*c* of the antenna unit 13 may be mis-aligned with the conductive pads 12*p* of the interconnection structure 12. For example, at least one of the conductive elements 13*c* of the antenna unit 13 may not be coupled to the interconnection structure 12.

According to some arrangements of the present disclosure, the electronic component 11 may control the number and location of the feed pads and the location of the ground pads. Therefore, the electronic device 1 can provide more than one kind of feeding and grounding configuration for the antenna unit. The feeding and grounding configuration may be controlled according to the functions of the terminal of the antenna unit (e.g., the conductive elements 13*c* of the antenna unit 13). The feeding and grounding configuration may be controlled to provide the desired RF impedance match to a feed point of the antenna unit. The feeding and grounding configuration for the antenna unit can be more flexible.

In addition, the conductive pads 12*p* of the interconnection structure 12 may be readily available or suitable for electrically coupling to different antenna units (such as antenna units having different numbers of terminals (I/Os), different terminals (I/Os) locations, different numbers of antennas, different sizes, different frequency bands, etc.). For example, the interconnection structure 12 may be able to electrically couple to a 2×2 array antenna, a 4×4 array antenna, an 8×8 array antenna, etc. For example, the interconnection structure 12 may be able to electrically couple to antenna units having different specifications. For example, the interconnection structure 12 may be a basic connector, a reference connector, or a multi-purpose connector. Different antenna units can be used or applied in the electronic device 1. For example, the interconnection structure 12 may allow different antenna units to be attached, removed, and reattached.

In addition, by using the interconnection structure 12 to couple the antenna unit 13 to the carrier 10, no molding compound is needed and the manufacturing cost is lower. The space 12*s* between the antenna element 13 and the carrier 10 can serve as a resonant cavity. The space 12*s* has a relatively lower dielectric constant (Dk) than the dielectric layer 13*d* of the antenna unit 13, and the thickness of the antenna unit 13 can be reduced. The signal transmission loss of the electronic device 1 can be mitigated, and the antenna gain of the electronic device 1 can be increased.

Furthermore, the antenna unit 13 may be detachable from the carrier 10 through the interconnection structure 12. The antenna unit 13 may be attached, removed, and reattached with respect to the carrier 10 through the interconnection structure 12. Therefore, the antenna unit 13 may be changed as needed without breaking the carrier 10.

Figure 3A:
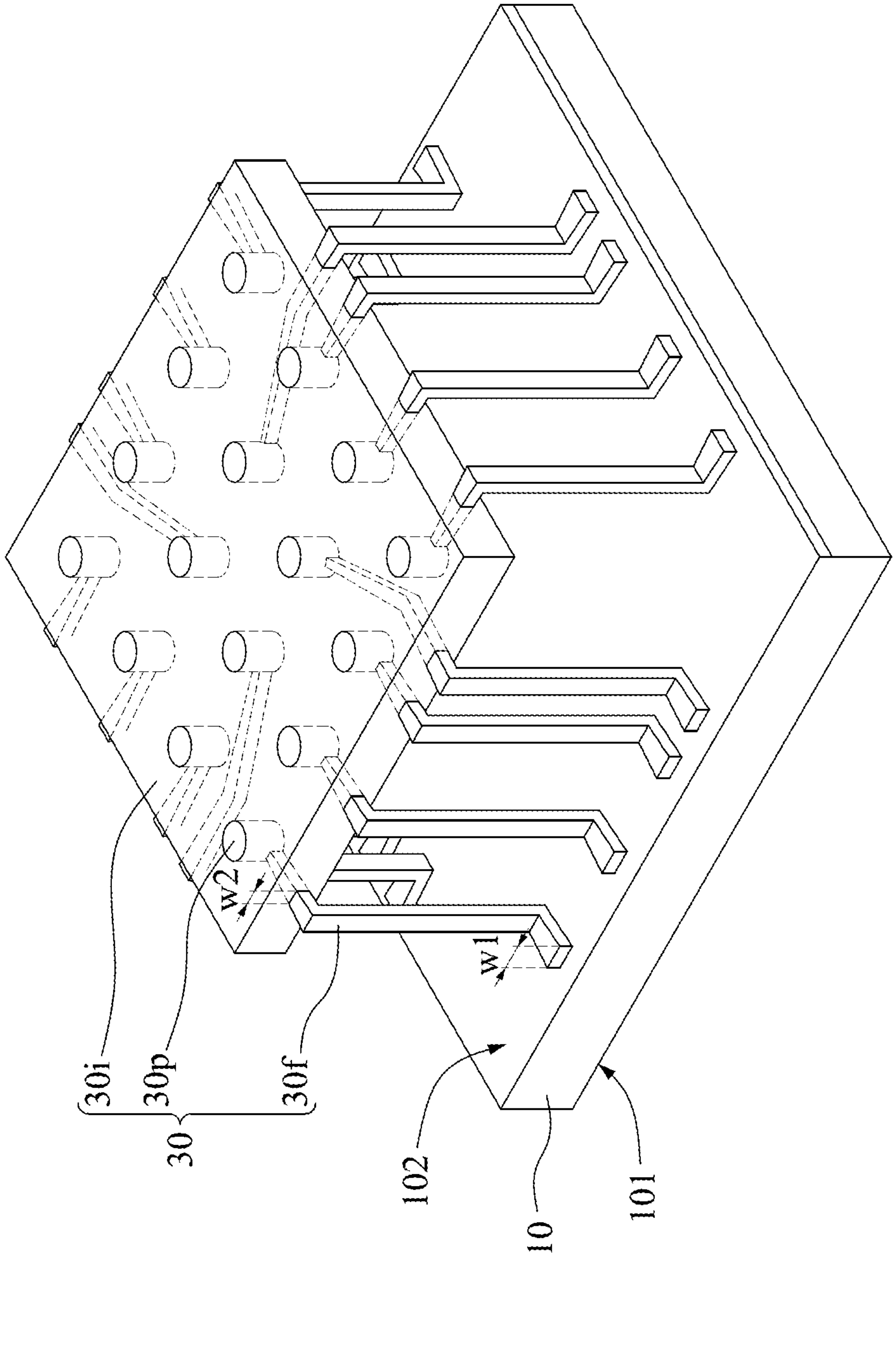
FIG. 3A illustrates a perspective view of a part of an electronic device in accordance with some arrangements of the present disclosure.

FIG. 3A illustrates a perspective view of a part of an electronic device in accordance with some arrangements of the present disclosure. The electronic device of FIG. 3A is similar to the electronic device 1 in FIG. 1A, differing as follows. Some elements in FIG. 1A are not shown in FIG. 3A for conciseness and clearness.

The interconnection structure 30 may be similar to the interconnection structure 12. The interconnection structure 30 may include frames 30*f* and an insulating layer 30*i*. In some arrangements, the frames 30*f* may each be at least partially exposed from a surface of insulating layer 30*i*. An exposed portion of the frame 30*f* may function as a conductive pad 30*p*.

The frames 30*f* may each have different widths. For example, a width w1 of a portion of the frame 30*f* closer to the carrier 10 may be greater than a width w2 of a portion of the frame 30*f* closer to the insulating layer 30*i*. For example, the width of the frame 30*f* may vary or be non-constant. For example, the frame 30*f* may taper toward the insulating layer 30*i*. For example, the width of the conductive pad 30*p* may be the smallest width of the frame 30*f*. For example, the width of the portion contacting the carrier 10 may be the greatest width of the frame 30*f*.

In some arrangements, the greater width of the frame 30*f* adjacent to the carrier 10 may enhance structural strength and stability for the interconnection structure 12. In addition, as the conductive pads 30*p* become smaller, more conductive pads 30*p* can be arranged or disposed over the insulating layer 30*i*. Therefore, the number of the feed pads and ground pads are increased and the design flexibility of the connection between the interconnection structure 12 and the antenna unit 13 is better.

Figure 3B:
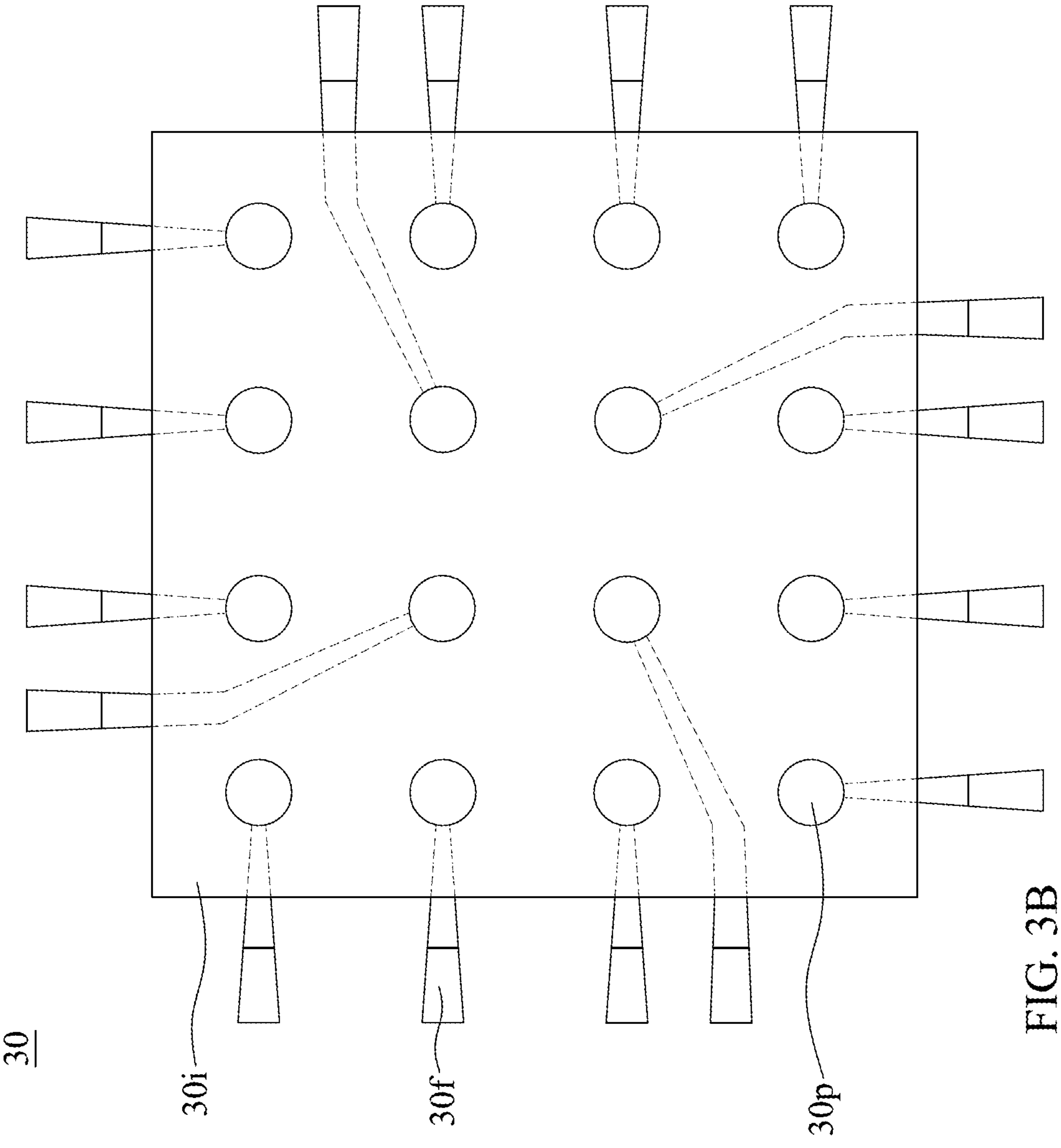
FIG. 3B illustrates a top view of a part of an electronic device in accordance with some arrangements of the present disclosure.

Referring to FIG. 3B, it illustrates a top view of the interconnection structure 30 in accordance with some arrangements of the present disclosure. The frames 30*f* may each taper toward the insulating layer 30*i*. The frames 30*f* may each taper inwardly. The conductive pad 30*p* may be the smallest portion of the frame 30*f*.

Figure 3C:
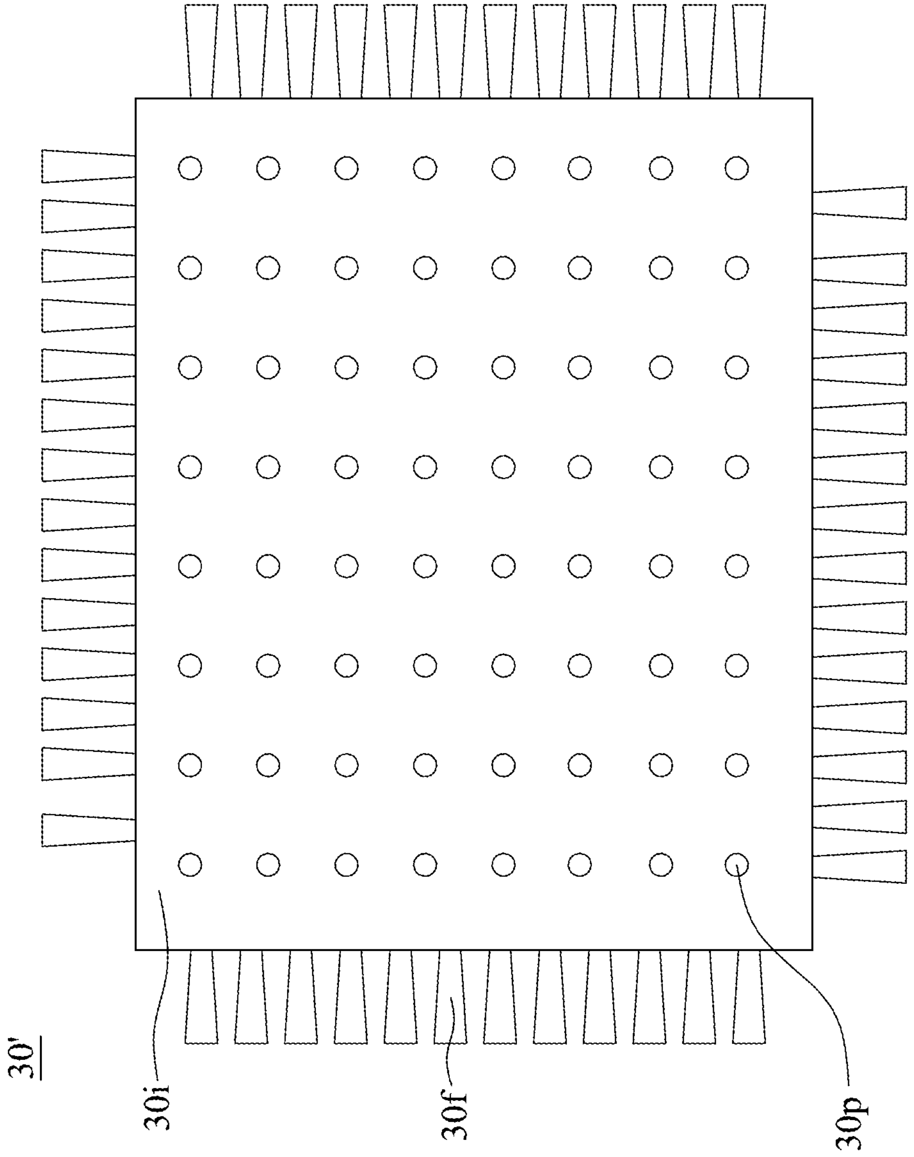
FIG. 3C illustrates a top view of a part of an electronic device in accordance with some arrangements of the present disclosure.

Referring to FIG. 3C, it illustrates a top view of the interconnection structure 30' in accordance with some arrangements of the present disclosure. The interconnection structure 30' is similar to the interconnection structure 30 in FIG. 3B, except that the width of the conductive pad 30*p* of the interconnection structure 30' is smaller than the width of the conductive pad 30*p* of the interconnection structure 30. Therefore, more conductive pads 30*p* of the interconnection structure 30' can be arranged or disposed over the insulating layer 30*i* of the interconnection structure 30'.

Figure 4:
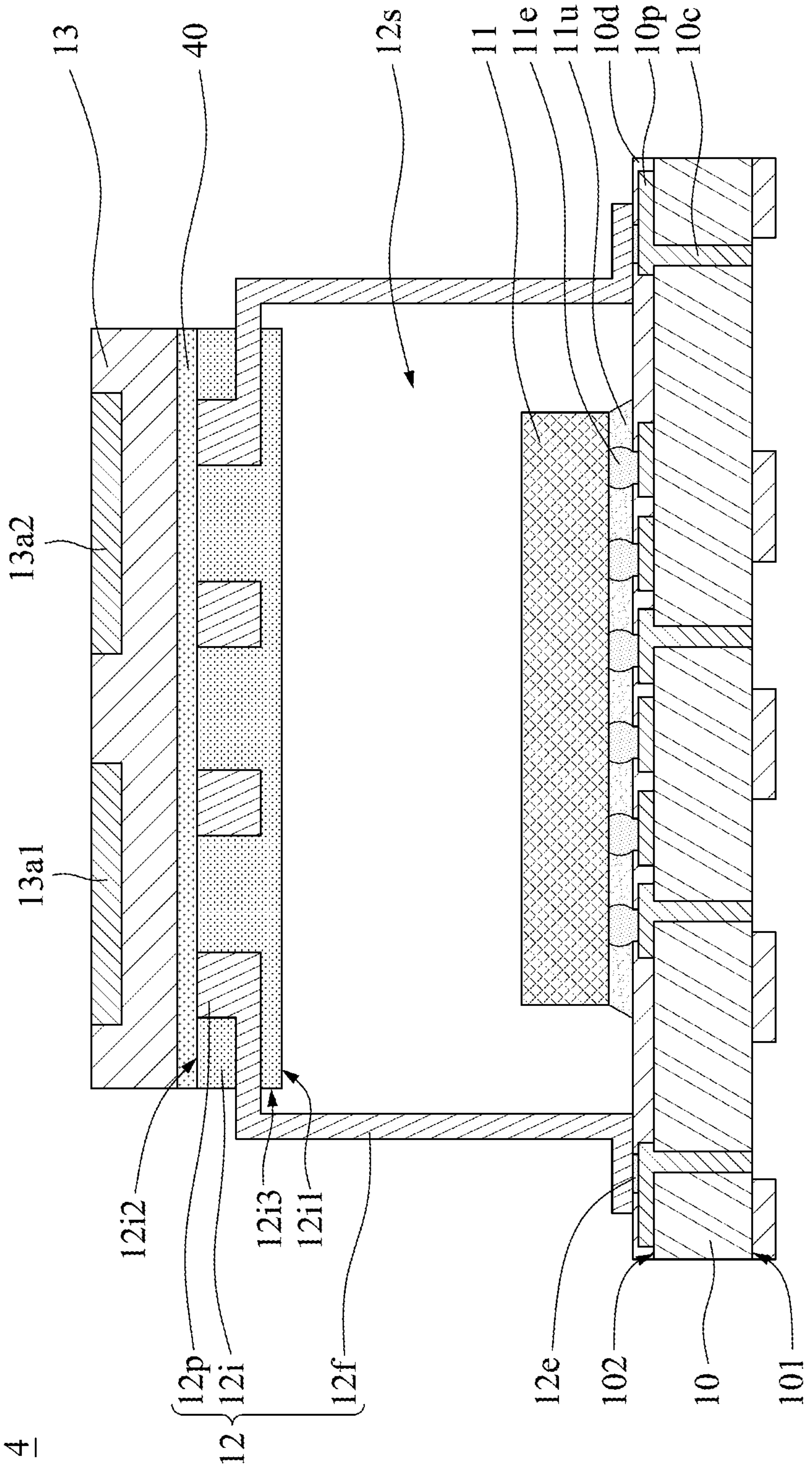
FIG. 4 illustrates a cross-sectional view of an electronic device in accordance with some arrangements of the present disclosure.

FIG. 4 illustrates a cross-sectional view of an electronic device 4 in accordance with some arrangements of the present disclosure. The electronic device 4 of FIG. 4 is similar to the electronic device 1 in FIG. 1A, differing as follows.

The antenna unit 13 may be attached to the surface 12*i*2 of the insulating layer 12*i* of the interconnection structure 12 by an adhesive layer 40. In some arrangements, the adhesive layer 40 may include thermoset tape, which can be thermally and/or optically cured to provide adhesion. By way of example, the material of the adhesive layer 40 may be a thermoset gel including a monomer such as a resin monomer, hardener, catalyst, solvent, diluent, fillers, and other additives. The RF signals may be fed from the conductive pads 12*p* to the antennas 13*a*1 and 13*a*2 through coupling.

FIGS. 5A, 5B, 5C, 5D, 5E, 5F, 5G, and 5H illustrates one or more stages of a method of manufacturing an electronic device in accordance with some arrangements of the present disclosure. In some arrangements, the electronic device 1 in FIG. 1A may be manufactured by the following operations with respect to FIG. 5. The FIGS. 5E, 5F, 5G, and 5H are cross-sectional views of the FIGS. 5A, 5B, 5C, and 5D.

Figure 5A:
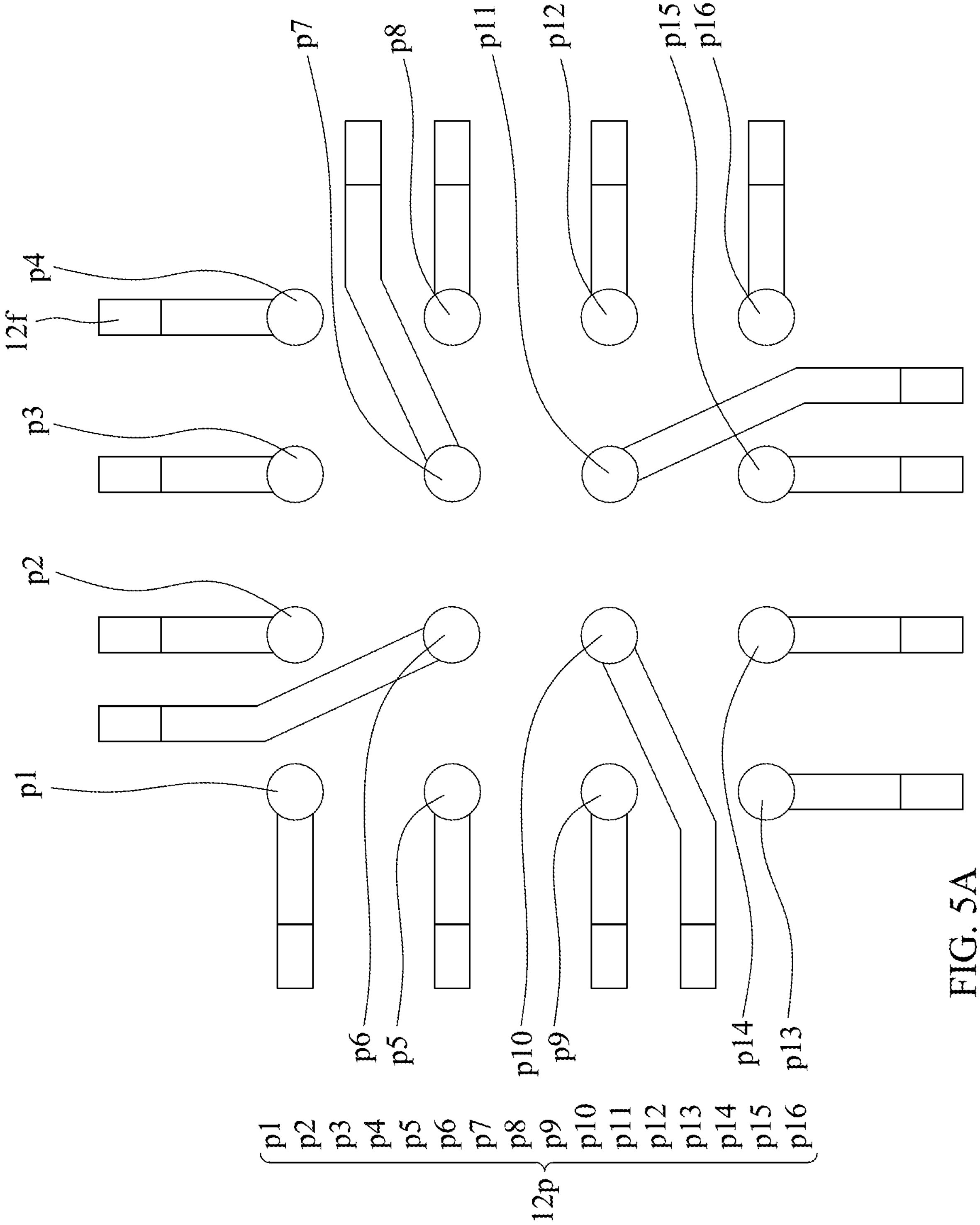
FIGS. 5A, 5B, 5C, 5D, 5E, 5F, 5G, and 5H are cross-sections of one or more stages of a method of manufacturing an electronic device in accordance with some arrangements of the present disclosure.
Figure 5B:
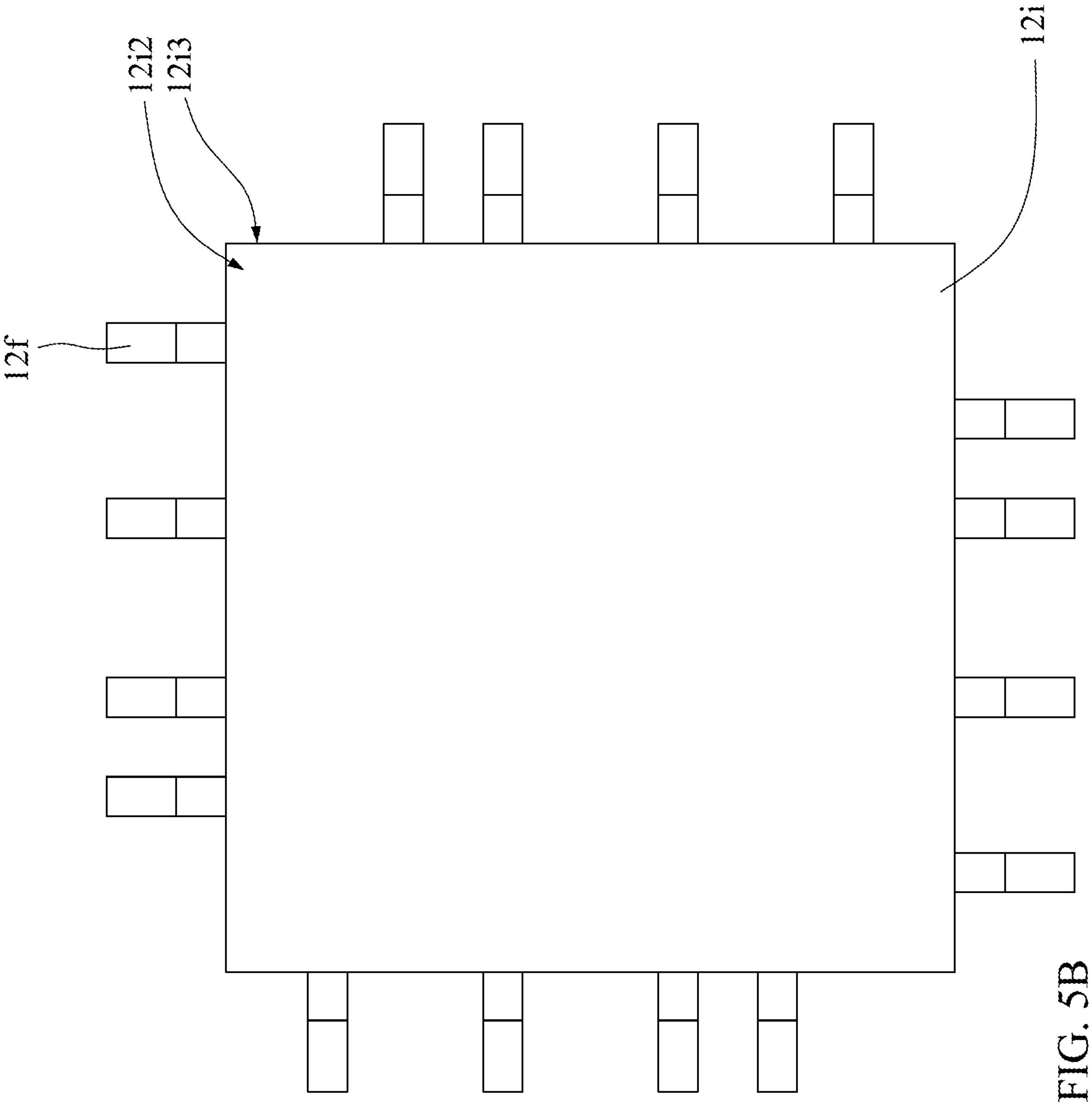
Figure 5C:
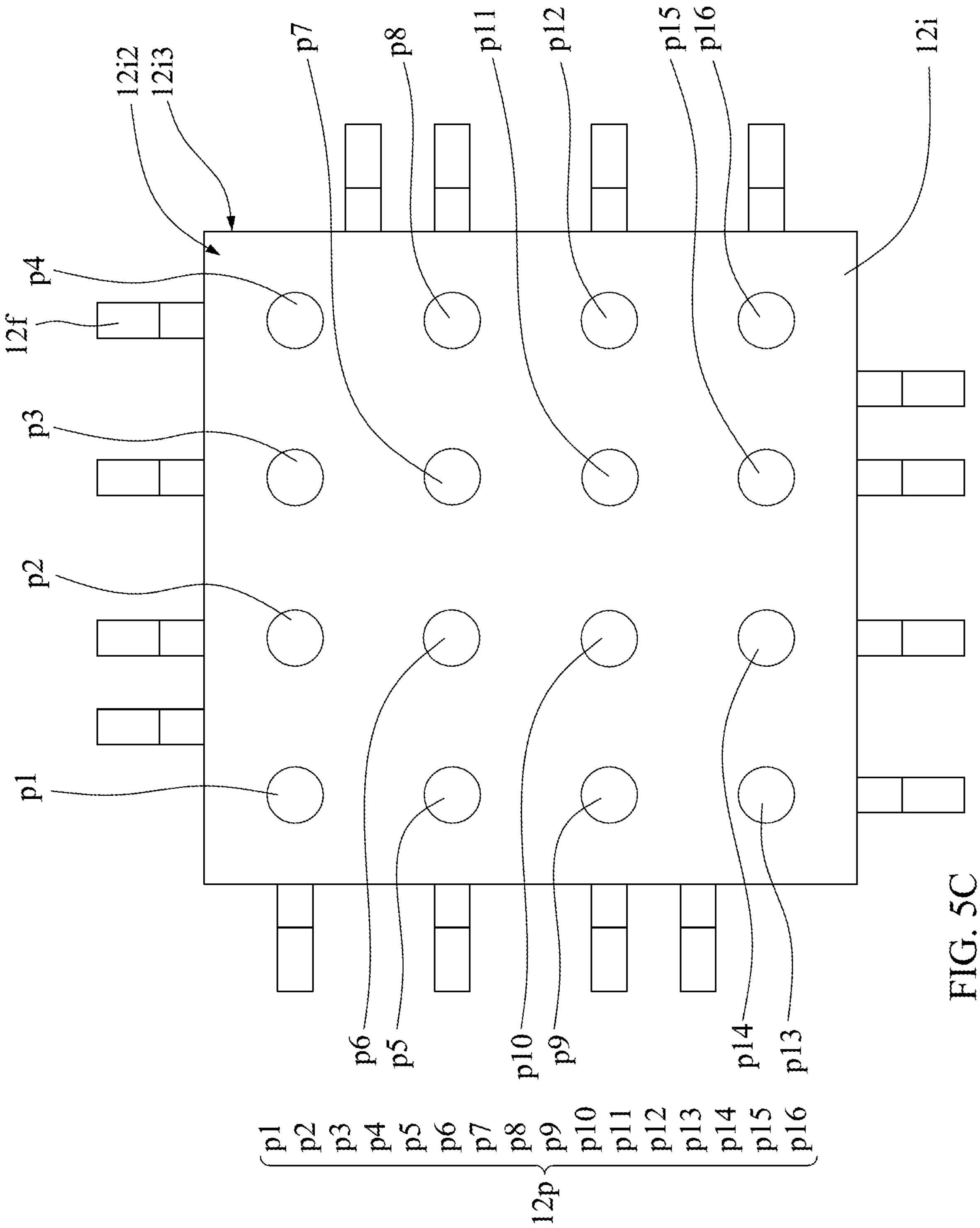
Figure 5D:
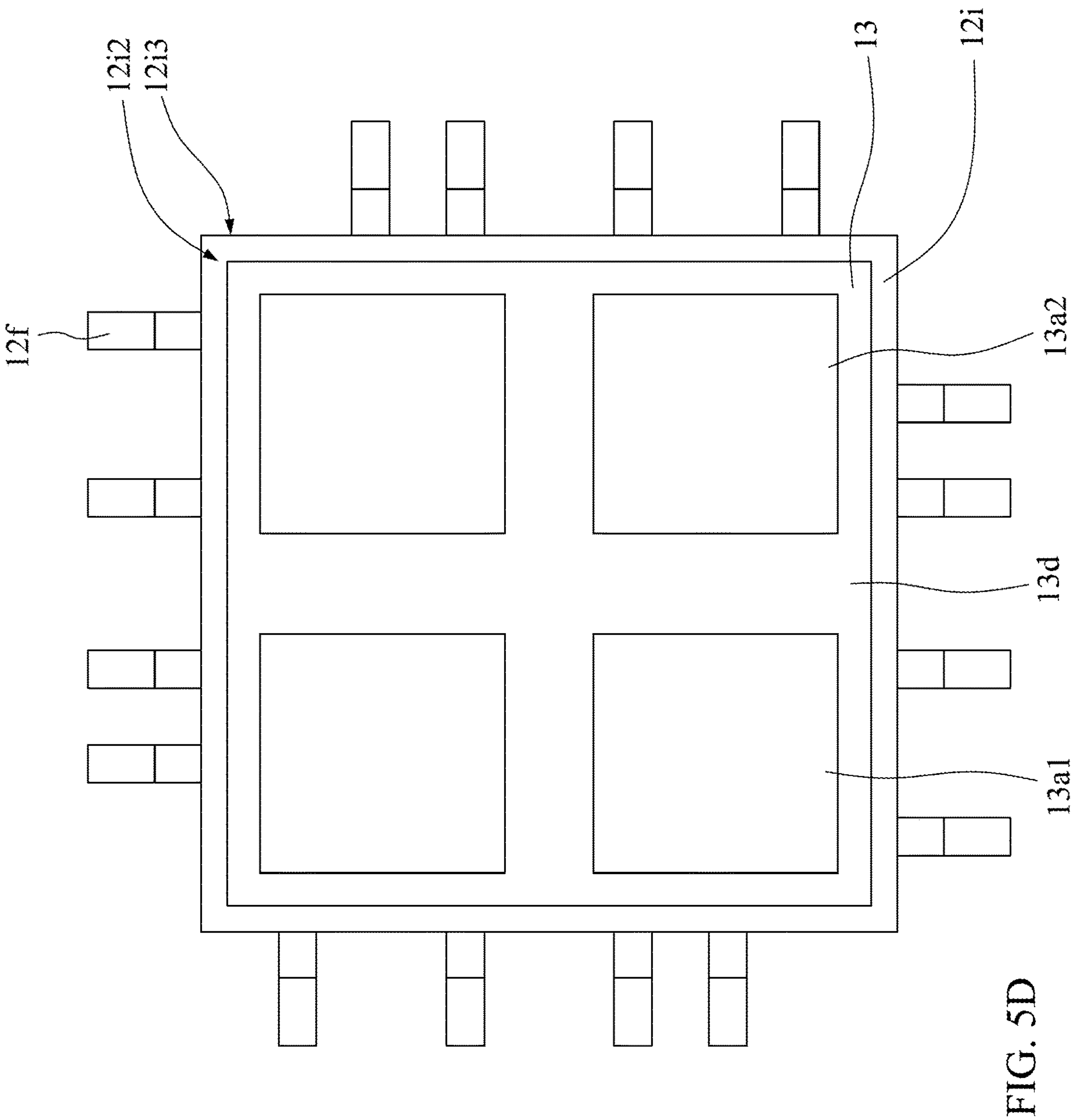
Figure 5E:
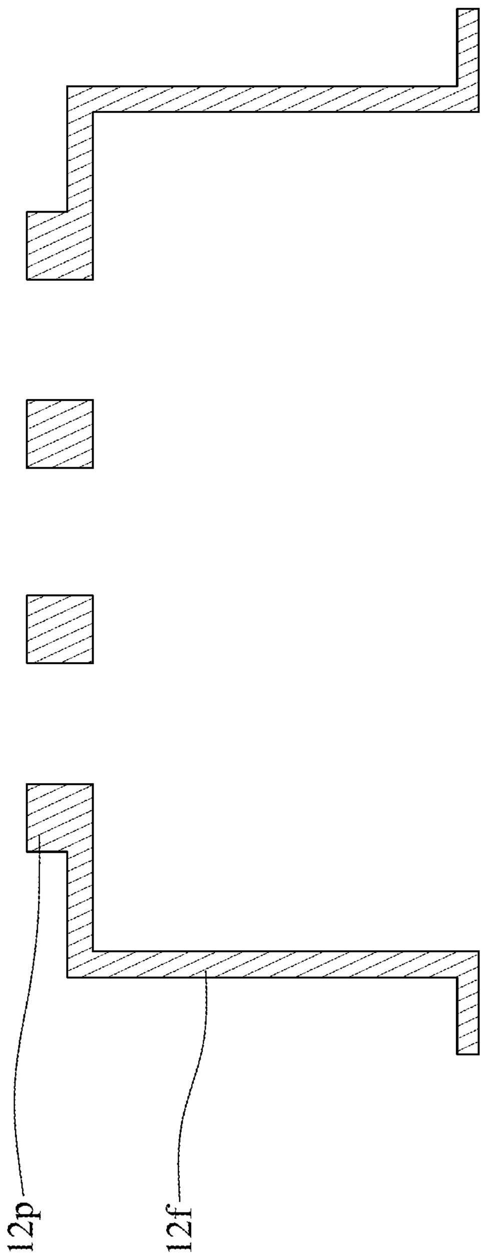

Referring to the FIGS. 5A and 5E, the frames (or stands, legs, anchors, clamping supports, etc.) 12*f* may be provided. The frames 12*f* may be spaced from one another. The frames 12*f* may be heated to form a curved shape or appearance. In some arrangements, the frames 12*f* may be shaped by a molding tool.

In some arrangements, the widths of the frames 12*f* may be changed by an etching operation and/or a punching operation. Therefore, the width of the frame 12*f* may vary or be non-constant, as shown in FIG. 3A.

Figure 5F:
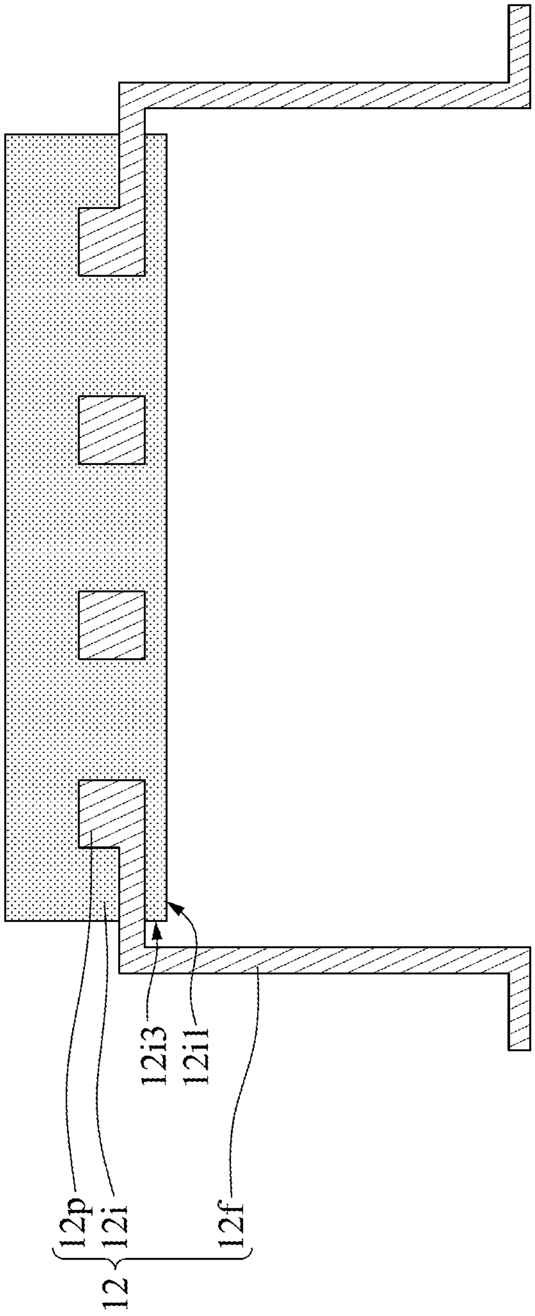

Referring to the FIGS. 5B and 5F, the insulating layer 12*i* may be formed to partially cover or encapsulate the frames 12*f*. In some embodiments, the insulating layer 12*i* may be formed by a molding technique, such as transfer molding or compression molding.

Figure 5G:
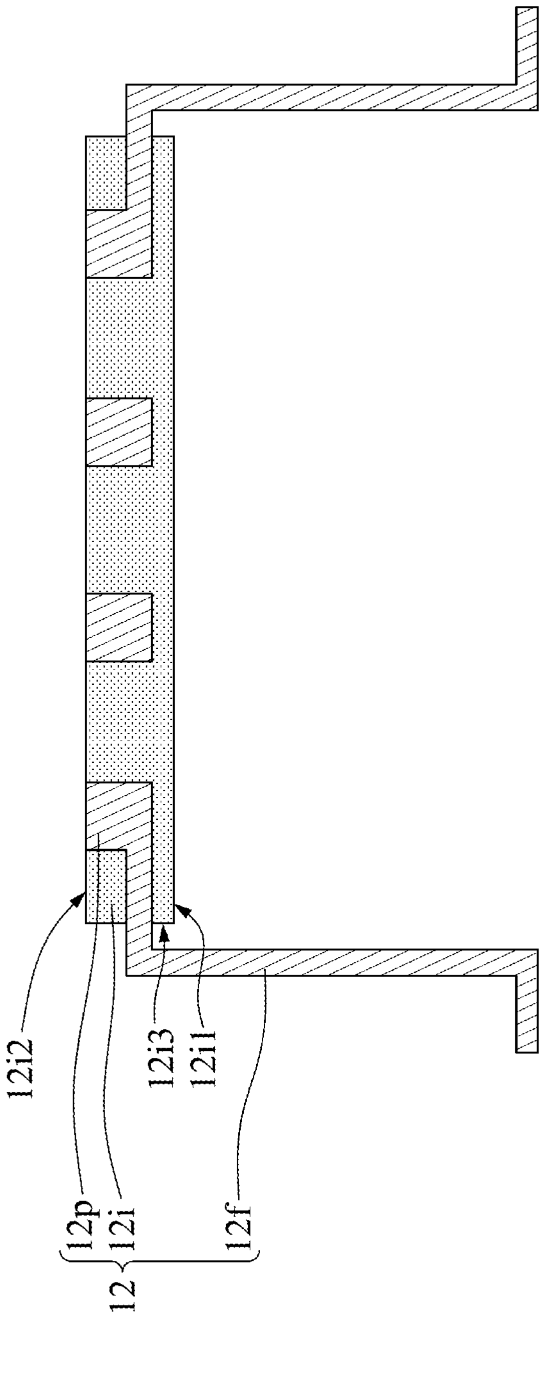

Referring to the FIGS. 5C and 5G, a portion of the insulating layer 12*i* may be removed to expose the conductive pads 12*p* by, for example, a grinding operation.

Figure 5H:
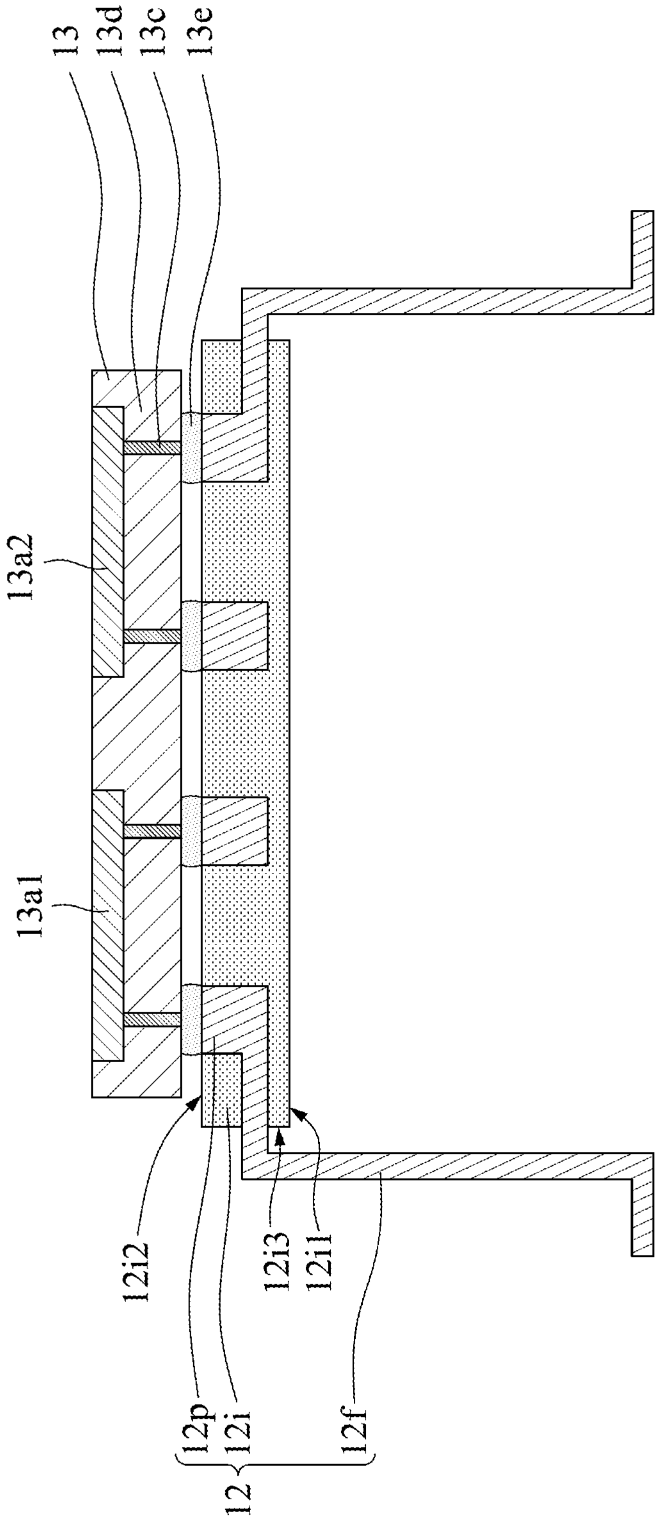

Referring to the FIGS. 5D and 5H, the antenna unit 13 may be disposed over or on the surface 12*i*1 of the insulating layer 12*i* of the interconnection structure 12. The antenna unit 13 may be electrically coupled to the interconnection structure 12 through the electrical contact 13*e*.

In some other arrangements, feed points (such as the conductive elements 13*c*) may be pre-formed in the antenna unit 13 and the feed points may be connected to the transmission lines (such as the conductive elements 10*c* in the carrier 10 in FIG. 1A) through the interconnection structure 12. The structure obtained from the FIGS. 5D and 5H may be attached to the carrier 10 in FIG. 1A through an electrical contact (such as the electrical contact 12*e*) or a mechanical or magnetic mean.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangements thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:

a carrier;

an interconnection structure disposed over the carrier and having a plurality of conductive pads, wherein one of the plurality of conductive pads is adjustable to function as a functional pad or a non-functional pad for an antenna unit; and an electronic component electrically connected to the interconnection structure through the carrier and configured to control the one of the plurality of conductive pads to function as the functional pad or the non-functional pad, wherein the interconnection structure comprises:

a plurality of conductive elements around the electronic component and configured for being detachable with respect to the carrier; and an insulating layer partially covering the plurality of conductive elements, wherein the plurality of conductive elements are partially exposed from the insulating layer to connect the antenna unit, and wherein the plurality of conductive elements extend from the insulating layer and downward to the carrier for supporting the insulating layer over the carrier.

2. The electronic device of claim 1, wherein the functional pad comprises a feed pad for feeding RF signals or a ground pad.

3. The electronic device of claim 1, wherein the plurality of conductive pads are arranged in an array from a top view of the insulating layer.

4. The electronic device of claim 1, wherein the antenna unit electrically couples to the carrier through the interconnection structure.

5. The electronic device of claim 4, wherein the antenna unit is detachable from the carrier through the interconnection structure.

6. The electronic device of claim 5, wherein the antenna unit comprises a plurality of feed points, and at least two of the plurality of conductive pads are adjustable to serve as feed pads connected to the plurality of feed points.

7. The electronic device of claim 1, wherein one of the plurality of conductive elements has a first portion and a second portion, the first portion is closer to the carrier than the second portion is and a width of the first portion is greater than a width of the second portion.

8. The electronic device of claim 7, wherein from a top view, the one of the plurality of conductive elements tapers toward the insulating layer.

9. The electronic device of claim 1, wherein the insulating layer of the interconnection structure has a first surface, a second surface facing the carrier, and lateral surfaces extending between the first surface of the insulating layer and the second surface of the insulating layer, and wherein the plurality of conductive elements extend from the lateral surfaces of the insulating layer.

10. The electronic device of claim 1, wherein the plurality of conductive pads includes feed pads disposed inside ground pads.

11. The electronic device of claim 1, wherein the electronic component is accommodated in a space defined by the carrier and the interconnection structure.

12. The electronic device of claim 11, wherein the space serves as a resonant cavity.

13. The electronic device of claim 12, wherein the electronic component, the carrier, the interconnection structure, and the antenna unit are vertically overlapped.

14. The electronic device of claim 1, further comprising: the antenna unit disposed over the interconnection structure.

15. The electronic device of claim 14, wherein at least one conductive element of the antenna unit is not coupled to the interconnection structure.

16. The electronic device of claim 14, further comprising: an adhesive layer disposed between the antenna unit and the interconnection structure.

* * * * *